United States Patent
Tambasco et al.

(10) Patent No.: US 12,554,060 B2
(45) Date of Patent: Feb. 17, 2026

(54) POLARIZATION SPLITTER ROTATOR

(71) Applicant: Cisco Technology, Inc., San Jose, CA (US)

(72) Inventors: Jean-Luc J. Tambasco, Macungie, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 18/361,710

(22) Filed: Jul. 28, 2023

(65) Prior Publication Data

US 2025/0035839 A1    Jan. 30, 2025

(51) Int. Cl.
*G02B 6/122* (2006.01)
*G02B 6/12* (2006.01)
*G02B 6/126* (2006.01)
*H04J 14/06* (2006.01)

(52) U.S. Cl.
CPC ......... *G02B 6/1223* (2013.01); *G02B 6/1228* (2013.01); *G02B 6/126* (2013.01); *G02B 2006/12061* (2013.01); *G02B 2006/1215* (2013.01); *H04J 14/06* (2013.01)

(58) Field of Classification Search
CPC .. G02B 6/12004; G02B 6/126; G02B 6/2766; G02B 6/2773; G02B 6/1228; G02B 6/1223
See application file for complete search history.

(56) References Cited

U.S. PATENT DOCUMENTS

| | | | |
|---|---|---|---|
| 2014/0270620 A1* | 9/2014 | Anderson | G02B 6/2773 385/11 |
| 2014/0270622 A1 | 9/2014 | Barwicz et al. | |
| 2017/0075063 A1* | 3/2017 | Brouckaert | G02B 6/2813 |
| 2017/0227710 A1 | 8/2017 | Lamponi et al. | |

(Continued)

FOREIGN PATENT DOCUMENTS

JP    2015169766 A    9/2015

OTHER PUBLICATIONS

Cai H., et al., "Demonstration of a Silicon Photonic Transceiver for Polarization-Based Discrete Variable Quantum Key Distribution", 2017 Conference on Lasers and Electro-Optics (CLEO), The Optical Society, May 14, 2017, 2 Pages, XP033237716, [retrieved on Oct. 25, 2017], Figure 1.

(Continued)

*Primary Examiner* — Michael P Mooney
(74) *Attorney, Agent, or Firm* — Patterson + Sheridan, LLP (57) ABSTRACT

Embodiments herein describe a PSR that includes a rotator with two layers that are separated by a dielectric layer. A first layer of the rotator includes a first waveguide formed from a lower refractive index material (e.g., SiN) while a second layer of the rotator includes a second waveguide formed from a higher refractive index material (e.g., Si). An optical signal, which can include two optical modes (e.g., TE and TM modes), is then introduced into the first layer where the TM mode is rotated. At the end of the rotator, the first waveguide (which is the same waveguide that received the optical signal) includes the optical signal which is now in the same optical mode. That is, one of the optical modes is rotated so that the light is the same type of optical mode (e.g., TE).

18 Claims, 5 Drawing Sheets

(56) References Cited

U.S. PATENT DOCUMENTS

| | | |
|---|---|---|
| 2017/0315294 A1 | 11/2017 | Socci et al. |
| 2019/0025506 A1 | 1/2019 | Park |
| 2022/0196813 A1 | 6/2022 | Shen et al. |
| 2022/0334313 A1 | 10/2022 | Su et al. |
| 2023/0029919 A1 | 2/2023 | Tambasco |
| 2024/0385376 A1* | 11/2024 | Jung ................. G02B 6/13 |

OTHER PUBLICATIONS

European Search Report for European Application No. 24187988.1, dated Dec. 11, 2024, 11 Pages.
Sacher W.D., et al., "Si3N4-on-SOI Polarization Rotator-Splitter Based on TM0-TE1 Mode Conversion", OFC 2014, OSA, Mar. 9, 2014, 3 Pages, XP032633133, [retrieved on Aug. 27, 2014], The Whole Document.

* cited by examiner

POLARIZATION SPLITTER ROTATOR

TECHNICAL FIELD

Embodiments presented in this disclosure generally relate to a polarization splitter rotator (PSR) with low back reflection.

BACKGROUND

Optical fibers coupled between transmitters and receivers typically have optical signals with power divided into multiple modes. That is, some of the power in the optical signal may be in a transverse electric (TE) mode while the remaining power is in a transverse magnetic (TM) mode. However, the receiver may be in an optical platform (e.g., a silicon photonic chip) that efficiently transmits only one of the optical modes (e.g., TE). The PSR is used to rotate any light in the undesired mode (e.g., TM) to the desired mode (e.g., TE). For example, the PSR can transform a single waveguide carrying both TE0 and TM0 light into two isolated waveguides carrying TE0.

Many current PSR designs have a large return loss due to significant back reflections. The use of silicon, especially poly-silicon, allows efficient hybridization and hence, mode rotation but it leads to a larger insertion loss, large variation in PSR performance, and has a high return loss, making it very challenging to meet return loss requirements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a PSR that includes a rotator that includes a first layer comprising a first waveguide formed from a lower refractive index material and a second layer comprising a second waveguide formed from a higher refractive index material. Moreover, the rotator is configured to receive an optical signal including a first optical mode at an input of the first waveguide, and, at an end of the rotator, the optical signal is primarily confined in the first waveguide and is rotated into a second optical mode.

Another embodiment presented in this disclosure is a receiver that includes a PSR that includes a rotator comprising a first layer comprising a first waveguide formed from a lower refractive index material and a second layer comprising a second waveguide formed from a higher refractive index material. The rotator is configured to receive an optical signal comprising multiple modes at an input of the first waveguide, and, at an end of the rotator, the optical signal is primarily confined in the first waveguide and includes only one optical mode. The PSR also includes a splitter coupled to the first waveguide of the rotator. In addition, the receiver includes a third waveguide coupled to a first end of the splitter and a fourth waveguide coupled to a second end of the splitter where the first waveguide, third waveguide, and fourth waveguide are formed from a same material.

Another embodiment presented in this disclosure is a receiver that includes a polarization beam splitter (PBS) configured to receive an optical signal comprising a first mode and a second mode, a first waveguide coupled to a first end of the PBS to receive light in the first mode, and a PSR. The PSR includes a rotator includes a first layer that includes a first waveguide formed from a lower refractive index material and a second layer that includes a second waveguide formed from a higher refractive index material where the rotator is coupled to the PBS to receive light in the second mode at an input of the first waveguide, and, at an end of the rotator, the light is primarily confined in the first waveguide and has been rotated into the first mode.

Example Embodiments

Embodiments herein describe a PSR that includes a rotator with two layers that are separated by a dielectric layer. A first layer of the rotator includes a first waveguide formed from a lower refractive index material (e.g., silicon nitride (SiN)) while a second layer of the rotator includes a second waveguide formed from a higher refractive index material (e.g., silicon (Si)). An optical signal, which can include both TE and TM modes, is then introduced into the first layer where the TM mode is rotated due to the loose optical coupling between the waveguides in the two layers. At the end of the rotator, the first waveguide (which is the same waveguide the optical signal was received on) includes the optical signal which is now in the same optical mode (e.g., TE), albeit in different order modes—e.g., TE0 and TE1. That is, the TM0 light in the received optical signal is rotated into the TE1 mode.

The PSR also includes a splitter that is coupled to the first layer of the rotator. The splitter separates the optical signal containing the TE0 and TE1 modes into two separate waveguides. When in separate waveguides, the two optical signals are both in the same optical mode (TE0).

While some previous PSR designs have rotators with two layers, these layers are stacked directly on (or very close to) each other, which increases back reflections. In the embodiments herein, there is a dielectric material between the two layers in the rotators (e.g., with a minimum thickness of 100 nm) which minimizes the back reflections. Further, the thickness of the second waveguide in the second layer can be thinner than the thickness of the first waveguide in the first layer. This can result in TM/TE hybridization where the TM light is rotated without the TM/TE1 light ever being confined in the second waveguide in the second layer.

In one embodiment, the optical signal enters into, and exits from, the rotator in the same layer (e.g., the first layer). In other PSR designs, the optical signal is introduced into one layer (e.g., SiN) in the rotator but then exits on a second layer of the rotator (e.g., Si). However, this may require another transition in the optical platform (e.g., the photonic chip) to transfer the optical signal back into SiN which may be the preferred waveguide material for some silicon photonics applications. The embodiments herein can avoid this since the optical signal can enter into, and exit from, the same layer in the rotator (e.g., a layer containing a SiN waveguide).

Figure 1:
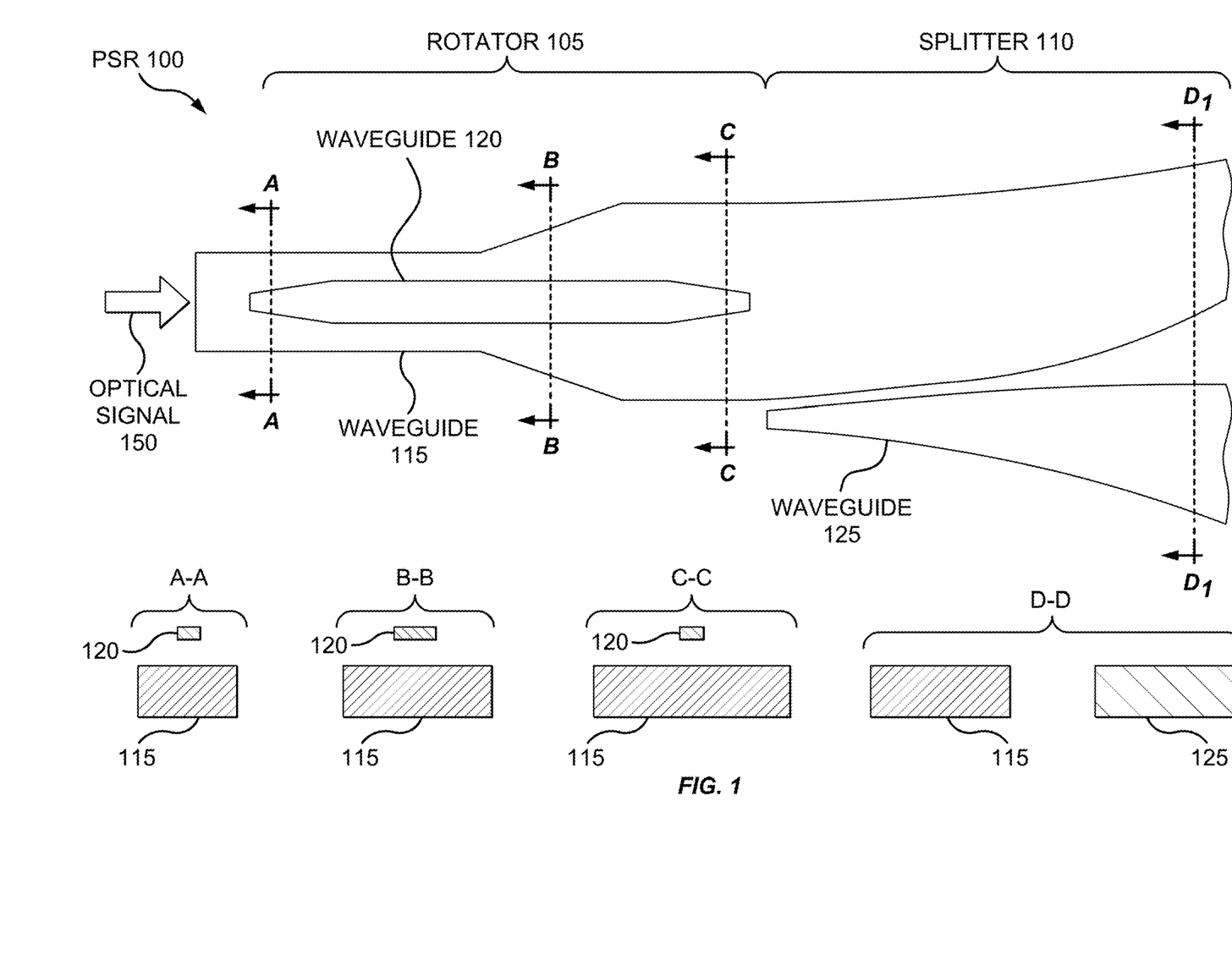
FIG. 1 illustrates a PSR, according to one embodiment described herein.

FIG. 1 illustrates a top view and four cross sections of a PSR 100, according to one embodiment described herein. The PSR 100 includes a rotator 105 and a splitter 110. The rotator 105 includes a first layer with a first waveguide 115 and a second layer that includes a second waveguide 120. In one embodiment, the first waveguide 115 and the second waveguide 120 are formed from different materials. In one embodiment, the material of the first waveguide 115 has a lower refractive index (or index of refraction) than the material of the second waveguide 120. In one example, the first waveguide 115 may be SiN while the second waveguide 120 is Si. However, this is just one suitable example. The materials of the waveguides 115 and 120 may vary depending on the type of optical platform that includes the PSR 100 (e.g., a silicon photonic chip or a different type of photonic chip).

As shown, an optical signal 150 is received by the first waveguide 115. In one example, the PSR 100 is part of a receiver that receives the optical signal 150 via an optical fiber. As a result, the optical signal 150 can have light in multiple modes—i.e., TE and TM. Typically, the optical platform efficiently processes light in a particular optical mode—e.g., only TE or only TM. The PSR 100 can transfer the light in the optical signal 150 into the same optical mode. The embodiments below describe transferring the light in the optical signal 150 into the TE mode, but a PSR could also be used to transfer the light into the TM mode.

FIG. 1 illustrates four cross sections of the PSR 100. The cross sections A-A, B-B, and C-C correspond to the front, middle, and end of the rotator 105 while the cross section D-D corresponds to the end of the splitter 110 (also referred to as a mode multiplexer or modemux). The cross section A-A illustrates a tip of the second waveguide 120 disposed over the first waveguide 115. Moreover, the second waveguide 120 is spaced apart from the first waveguide 115 by a dielectric material (e.g., an oxide material such as silicon dioxide). While other PSR designs include stacked waveguides, the waveguides are generally directly contacting (or separated by only a very thin dielectric material due to fabrication limitations). Here, the second waveguide 120 is intentionally spaced apart from the first waveguide 115, which advantageously minimizes back reflections and return loss of the optical signal 150. In one embodiment, the gap between the first waveguide 115 and the second waveguide 120 is at least 100 nm. In another embodiment, the gap may be at least 150 nm. In one embodiment, the gap is between 100-400 nm in thickness.

In one embodiment, at the cross section A-A, the width of the first waveguide 115 may range from 1-3 microns. This is a larger width than typical waveguides in traditional PSRs that receive the optical signal 150, but having a larger width can also reduce back reflections. The width of the second waveguide 120 may range from 100-550 nm along the length of the rotator 105.

Moreover, in this embodiment, the first waveguide 115 has a thickness that is greater than the thickness of the second waveguide 120. For example, the first waveguide 115 may have a thickness of 175-400 nm while the second waveguide 120 has a thickness of 50-150 nm. In one embodiment, the thickness of the second waveguide 120 is less than 200 nm. As discussed in more detail in FIG. 2, having a thinner second waveguide 120 can enable hybridization of the TM mode, and prevent the TM light from coupling into the second waveguide 120. That is, having a thin second waveguide 120 prevents it from pulling in the light in the TM mode.

The B-B cross section indicates that both the first waveguide 115 and the second waveguide 120 have increased in width (e.g., flared) relative to the cross section A-A. However, the gap between the waveguides remains the same. Flaring the waveguides can enable the rotation of the TM light which is discussed in detail in FIG. 2.

The C-C cross section indicates that that the second waveguide 120 has decreased in width (e.g., tapered) relative to the cross section B-B. The C-C cross section is near a second tip of the second waveguide 120 where it terminates. In this example, the width of the first waveguide 115 has increased. At the end of the rotator 105, the light of the optical signal is in the TE mode and is primarily confined in the first waveguide 115. Thus, the optical signal is received by, and exits from, the rotator 105 in the same waveguide (i.e., the first waveguide 115).

Moreover, the cross sections A-A, B-B, and C-C illustrate the second waveguide 120 has two tips, where it flares at the beginning of the rotator 105 but tapers (and terminates) near the end of the rotator 105.

The splitter 110 separates the light of the optical signal that was originally in the TE mode into one waveguide (e.g., this light stays in the first waveguide 115) while the light of the optical signal that was originally in the TM mode but is now in the TE mode is transferred to a third waveguide 125. Thus, the light from the optical signal 150 is divided into the two waveguides in the splitter 110 but the light in the two waveguides is not necessarily equally since more light may have been in the TM mode than in the TE mode, or vice versa.

As shown by the cross second D-D, the first waveguide 115 and the third waveguide 125 are in the same layer. As such, the first waveguide 115 and the third waveguide 125 can be formed from the same material (e.g., SiN), but this is not a requirement.

In one embodiment, the splitter 110 has an adiabatic optical waveguide structure. In one embodiment, the splitter 110 has a sufficient length so that the splitting of the optical signal 150 is performed with minimal energy loss and high isolation as the optical signal 150 propagates through the splitter 110. For example, the splitter 110 may have a length in a range of about 40 to 50 microns.

Figure 2:
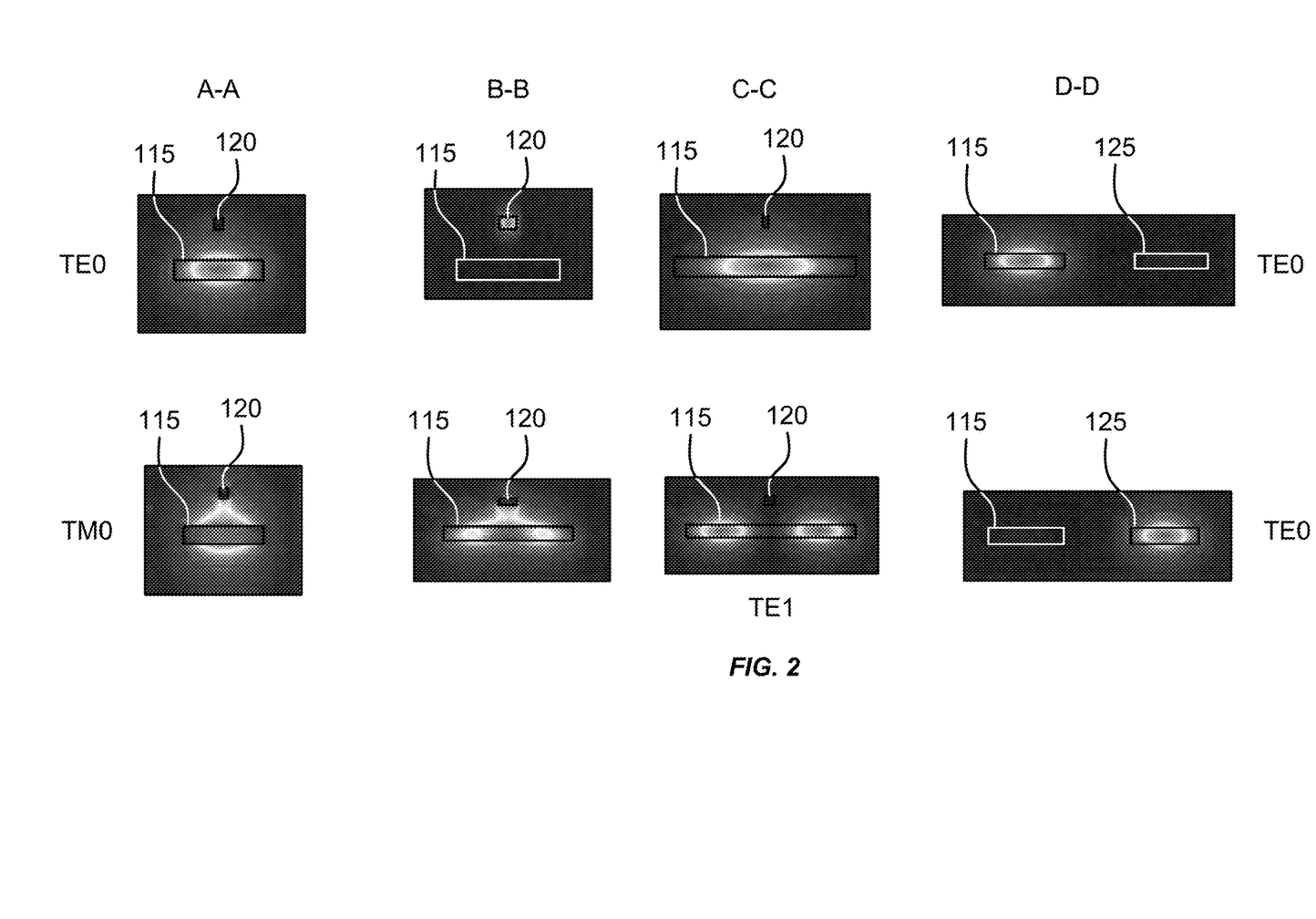
FIG. 2 illustrates the operation of the PSR in FIG. 1, according to one embodiment described herein.

FIG. 2 illustrates the operation of the PSR in FIG. 1, according to one embodiment described herein. FIG. 2 illustrates the cross sections A-A, B-B, C-C, and D-D from FIG. 1 in two rows. The upper row illustrates the field strength of the TE light in the received optical signal while the second row illustrates the field strength of the TM light in the received optical signal. That is, FIG. 2 separately illustrates what happens to the TE light and the TM light as it propagates through the rotator and the splitter in FIG. 1.

Turning first to the TE light in the upper row, at the A-A cross section most of the light is confined in the first waveguide 115. However, at the B-B cross section most of the TE light is instead confined in the second waveguide

120. This is due to the flaring of the first and second waveguides as shown in the top view of the PSR in FIG. 1.

At the C-C cross section, most of the TE light is again confined in the first waveguide 115. Again, this is primarily due to the change in widths of the first and second waveguides.

At the D-D cross section, the splitter keeps the TE light in the first waveguide 115. The light may be in the TE0 mode at the cross section D-D.

Turning to the TM light in the lower row, at the A-A cross section most of the light is proximate to the first waveguide 115. That is, the light may be in the cladding (or oxide) surrounding the first waveguide 115.

At the B-B cross section, the TM light is hybridized between the TM0 and TE1 modes. This is due the second waveguide 120 (e.g., Si) loading the first waveguide 115 (e.g., SiN), as opposed to the first waveguide 115 (SiN) loading the second waveguide 120 (Si).

The C-C cross section indicates that the TM light has been rotated into the TE1 mode and is confined in the first waveguide 115. Thus, at cross section C-C the TE light in the original optical signal and the TM light in the original optical signal are confined in the first waveguide 115, albeit the TM light has been rotated into the TE1 mode.

The D-D cross section indicates that the splitter converts the light into the TE0 mode and confines the light in the third waveguide 125. Thus, at the end of the PSR, the light that was original in the TE mode is confined in the first waveguide 115 while the light that was originally in the TM mode has been rotated into the TE mode and is confined in the third waveguide 125.

Notably, in this embodiment, the TM light is never confined in the second waveguide 120. For example, the TM light is hybridized in the TM0 and TE1 modes at cross section C-C but very little if any of this light is confined in the second waveguide 120.

Some notable features of the PSR 100 in FIGS. 1 and 2 is that the first waveguide 115 becomes multimode and remains wide along the length of the PSR. In contrast, the thickness and width of the second waveguide 120 is controlled so, in this example, it is never multimode. Moreover, the first waveguide 115 does not have tips, while the second waveguide 120 does.

Also, in one embodiment, the splitter is the same material (e.g., SiN) as the input and output of the rotator (e.g., the first waveguide). Further, there may not be any interlayer transitions. Further, the PSR can support high power TM to TE, or TE to TM rotation.

In another embodiment, the PSR can be used as a polarization multiplexer use in transmit (Tx) mode. That is, the PSR can receive two separate optical signals in TE0 polarization (using the two waveguides in the splitter as inputs rather than outputs) and then combine them in a single waveguide as TE0 and TM0 light. Thus, in this embodiment, the splitter serves as the input while the rotator serves as the output of the PSR.

Figure 3:
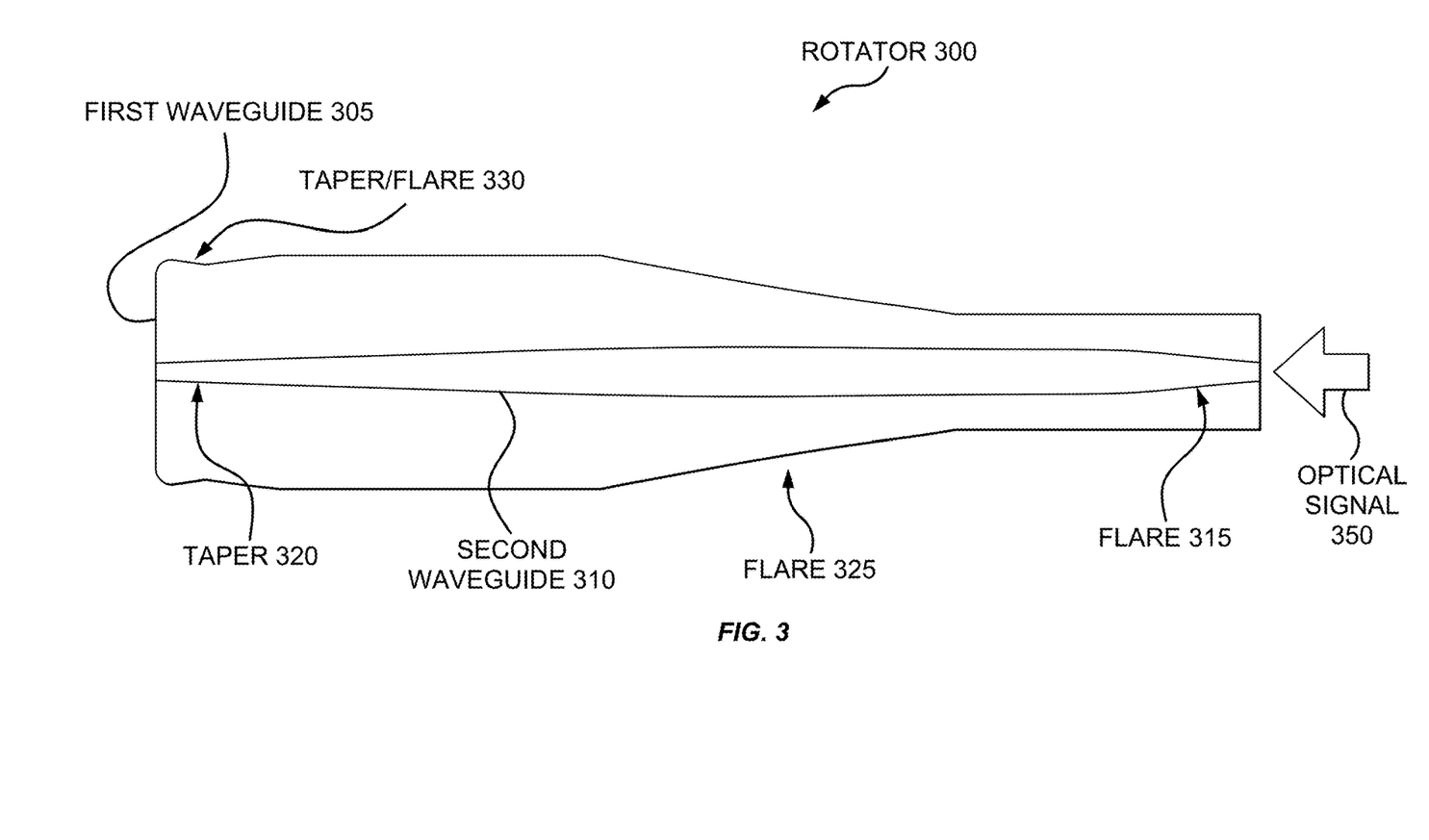
FIG. 3 illustrates an example rotator in a PSR, according to one embodiment described herein.

FIG. 3 illustrates an example rotator 300 in a PSR, according to one embodiment described herein. The rotator 300 includes a first layer with a first waveguide 305 and a second layer that includes a second waveguide 310. In one embodiment, the first waveguide 305 and the second waveguide 310 are formed from different materials. In one embodiment, the material of the first waveguide 305 has a lower refractive index (or index of refraction) than the material of the second waveguide 310. In one example, the first waveguide 305 may be SiN while the second waveguide 310 is Si. However, this is just one suitable example. The materials of the waveguides 305 and 310 may vary depending on the type of optical platform that includes the PSR (e.g., a silicon photonic chip or a different type of photonic chip).

As shown, an optical signal 350 is received by the first waveguide 305. As discussed above, the optical signal 350 can have light in multiple modes—i.e., TE and TM. The rotator 300 can transfer the light in the optical signal 350 into the same mode.

In this rotator design, the second waveguide 310 has a first tip near the location where the optical signal 350 enters the first waveguide 305 (e.g., the right side of FIG. 3). The second waveguide 310 then flares 315 where the width of the second waveguide 310 increases. Near the end of the rotator 300, the second waveguide 310 begins to taper 320 where its width decreases.

In contrast, the first waveguide may have the same width for a first portion of the rotator 300 but then begins to flare 325 near the middle of the rotator 300. Near the end of the rotator 300, the first waveguide 305 has a portion where it tapers and then flares slightly (labeled taper/flare 330).

While having a different top profile than the rotator 105 in FIG. 1, the rotator 300 in FIG. 3 has a similar operation as shown in FIG. 2. That is, the TE light is moved from the first waveguide 305 into the second waveguide 310 and back into the first waveguide 305. The TM light is hybridized into TM0/TE1, and then confined as TE1 light in the first waveguide 305. A splitter (not shown) can be coupled to the left end of the first waveguide 305 and can be used to split the original TE and TM light into two separate waveguides as discussed above.

Like the rotator in FIG. 1, the first waveguide 305 and the second waveguide 310 are spaced apart from each other using an oxide. This gap may be at least 100 nm in thickness. Further, while the embodiments discussed the second waveguide being above the first waveguide in FIGS. 1-3, the rotators will function in the same way if the second waveguide is below the first waveguide.

FIGS. 1 and 3 illustrate that there are several different shapes and profiles of the rotator which can provide satisfactory performance for providing an efficient PSR with low back reflections. Thus, the embodiments herein are not limited to any particular rotator shape or design, and other rotator shapes or designs can be used so long as they operate similar to the rotators described herein.

Figure 4:
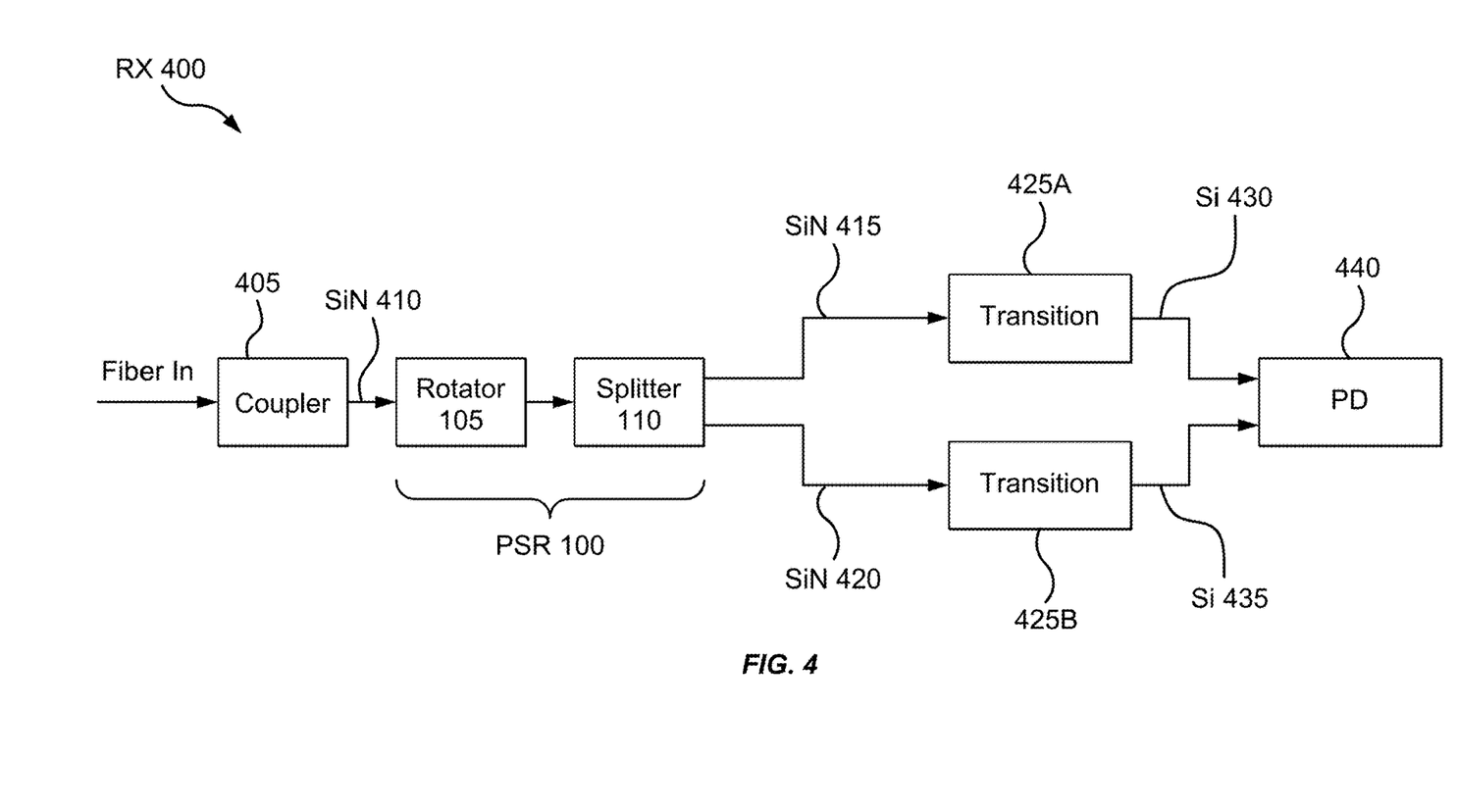
FIG. 4 illustrates an optical platform with the PSR in FIG. 1, according to one embodiment described herein.

FIG. 4 illustrates an optical platform with the PSR in FIG. 1, according to one embodiment described herein. In this example, the optical platform is a receiver (RX) 400. As shown, an optical fiber is optical coupled to a coupler 405 (e.g., a prong coupler) which confines the optical signal into a SiN waveguide 410.

The optical signal is then introduced into the PSR 100 which includes the rotator 105 and splitter 110 discussed above. While FIG. 4 illustrates using the rotator 105, in another embodiment, the rotator 300 in FIG. 3 could be used.

As discussed above, the PSR transfers the TE light in the received optical signal into a first SiN waveguide 415 and the TM light in the received optical signal (which is now TE light) into a second SiN waveguide 420. Although not shown, the optical platform can have any number of different types of optical elements that are coupled to the SiN waveguides 415 and 420.

In this embodiment, SiN to Si transitions 425A and 425B are used to transfer the light in the waveguides 415 and 420 into Si waveguides 430 and 435, respectively. The light in the Si waveguides 430 and 435 is then detected using a photodiode (PD) 440.

Advantageously, in FIG. 4 the optical signals are transmitted almost entirely in SiN (except for the small amount of Si in the rotator 105). This means any optical processing on the signals performed between the PSR 100 and the transitions 425A and 425B can occur in SiN. In contrast, in current PSR designs, the optical signals may be received in SiN but are then output in Si. Thus, to do any processing on the signals using SiN (which is typically preferred over Si), the optical platform would need two additional transitions to move the signals from Si waveguides output by the PSR into SiN waveguides. However, in FIG. 4, the optical signals remain in SiN waveguides when exiting the PSR 100, and thus, these transitions are not needed. This can reduce the size of the RX 400 and make it easier to fabricate.

Figure 5:
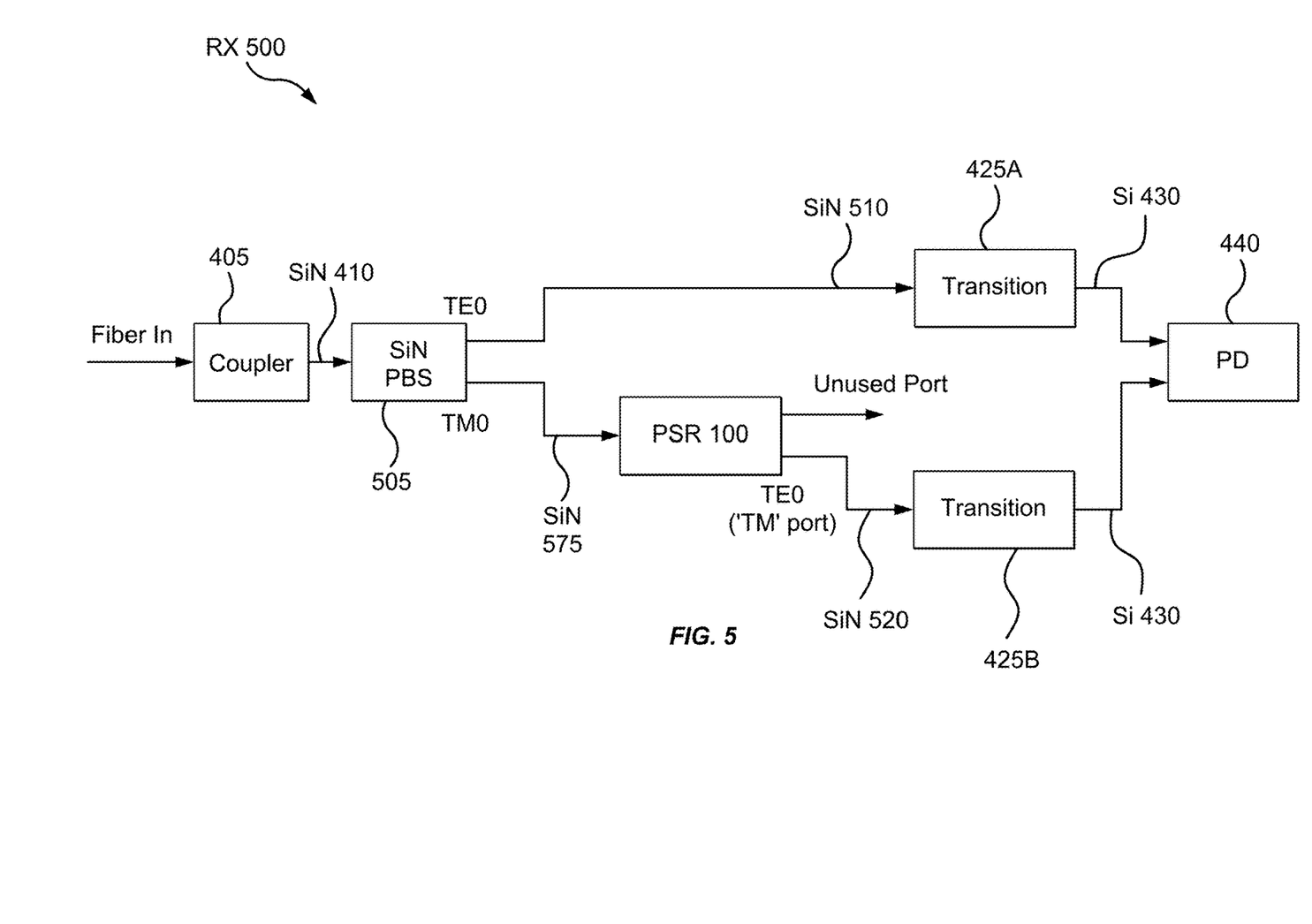
FIG. 5 illustrates an optical platform with the PSR in FIG. 1, according to one embodiment described herein.

FIG. 5 illustrates an optical platform with the PSR in FIG. 1, according to one embodiment described herein. In this example, the optical platform is a RX 500 for receiving high power optical signals. Like in FIG. 4, an optical fiber is optical coupled to a coupler 405 (e.g., a prong coupler) which confines the optical signal into the SiN waveguide 410.

However, instead of inputting the optical signal into the PSR, the RX 500 in FIG. 5 first receives the signal in a SiN polarization beam splitter (PBS) 505. The PBS 505 separates the TE light in the received optical signal from the TM light without rotating. In this example, the TE light is transmitted on a SiN waveguide 510 while the TM light is transmitted on a SiN waveguide 575 to the PSR 100.

The PSR 100 then rotates the TM light and outputs it on the SiN waveguide 520. However, since the PBS 505 already removed the TE light, the PSR 100 has an unused port.

Like in FIG. 4, FIG. 5 includes SiN to Si transitions 425A and 425B which move the light in the waveguides 510 and 520 into Si waveguides 430 and 435, respectively. The light in the Si waveguides 430 and 435 is then detected using the PD 440.

The RX 500 may be preferred for high power TM to TE (or TM to TE) rotation. That is, it may be more efficient to task the PBS 505 to initially separate the TE and TM light before the PSR 100 rotates the TM light into TE light. Stated differently, the PBS 505 may be more efficient than the PSR 100 at splitting the light in the different modes. Advantageously, the PBS 505 can be made of the same layer (and the same material) as the first waveguide in the PSR 100—e.g., SiN.

While FIGS. 4 and 5 describe using Si and SiN in their optical platforms, this is just one example of suitable materials. Other materials may be used depending on the type of the optical platforms.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A polarization splitter rotator (PSR), comprising:
a rotator comprising a first layer comprising a first waveguide formed from a lower refractive index material and a second layer comprising a second waveguide formed from a higher refractive index material, wherein the rotator is configured to receive an optical signal comprising a first optical mode at an input of the first waveguide, and, at an end of the rotator, the optical signal is primarily confined in the first waveguide and is rotated into a second optical mode,
wherein a width of the second waveguide increases at an input of the rotator and decreases at the end of the rotator,
wherein the width of the second waveguide does not exceed 550 nm along a length of the rotator, and the width of the first waveguide ranges from 1 to 3 microns along the length of the rotator; and
a splitter coupled to the first waveguide of the rotator.

2. The PSR of claim 1, wherein the first waveguide and the second waveguide are separated by a dielectric layer with a thickness of at least 100 nm.

3. The PSR of claim 2, wherein the dielectric layer has a thickness greater than 200 nm.

4. The PSR of claim 1, wherein the second waveguide is thinner than the first waveguide, and the first waveguide has a greater width than the second waveguide.

5. The PSR of claim 4, wherein a thickness of the second waveguide is less than 200 nm and a thickness of the first waveguide is equal to or greater than 200 nm.

6. The PSR of claim 1, wherein the second waveguide begins and ends in the rotator but the lower refractive index material in the first waveguide extends into the splitter.

7. The PSR of claim 1, wherein, at an input of the rotator, a TE portion of the optical signal is primarily confined in the first layer, wherein, at a middle of the rotator, the TE portion of the optical signal is primarily confined in the second layer, and wherein, at an end of the rotator, the TE portion of the optical signal is primarily confined in the first layer.

8. The PSR of claim 7, wherein the rotator is configured to rotate TM light in the optical signal into a TE mode confined primarily in the first layer at the end of the rotator.

9. The PSR of claim 8, wherein, as part of rotating the TM light into the TE mode, the rotator is configured to hybridize the TM light into TE1 and TM0 modes.

10. The PSR of claim 8, wherein the TM light is never confined in the second waveguide.

11. A receiver, comprising:
a PSR comprising:
a rotator comprising a first layer comprising a first waveguide formed from a lower refractive index material and a second layer comprising a second waveguide formed from a higher refractive index material, wherein the rotator is configured to receive an optical signal comprising multiple modes at an input of the first waveguide, and, at an end of the rotator, the optical signal is primarily confined in the first waveguide and includes only one optical mode, wherein a width of the second waveguide increases at an input of the rotator and decreases at the end of the rotator, wherein the width of the second waveguide does not exceed 550 nm along a length of the rotator, and the width of the first waveguide ranges from 1 to 3 microns along the length of the rotator; and a splitter coupled to the first waveguide of the rotator,
a third waveguide coupled to a first end of the splitter; and
a fourth waveguide coupled to a second end of the splitter, wherein the first waveguide, third waveguide, and fourth waveguide are formed from a same material.

12. The receiver of claim 11, wherein the first waveguide and the second waveguide are separated by a dielectric layer with a thickness of at least 100 nm.

13. The receiver of claim 11, wherein the second waveguide is thinner than the first waveguide, and the first waveguide has a greater width than the second waveguide.

14. The receiver of claim 11, further comprising:
a first transition coupled to the third waveguide and configured to transfer light received from the third waveguide into a fifth waveguide made from a different material than the third waveguide; and
a second transition coupled to the fourth waveguide and configured to transfer light received from the fourth waveguide into a sixth waveguide made from a different material than the fourth waveguide.

15. A receiver, comprising:
a polarization beam splitter (PBS) configured to receive an optical signal comprising a first mode and a second mode;
a third waveguide coupled to a first end of the PBS to receive light in the first mode;
a polarization splitter rotator (PSR) comprising:
a rotator comprising a first layer comprising a first waveguide formed from a lower refractive index material and a second layer comprising a second waveguide formed from a higher refractive index material, wherein the rotator is coupled to the PBS to receive light in the second mode at an input of the first waveguide, and, at an end of the rotator, the light is primarily confined in the first waveguide and has been rotated into the first mode, wherein a width of the second waveguide increases at an input of the rotator and decreases at the end of the rotator, wherein the width of the second waveguide does not exceed 550 nm along a length of the rotator, and the width of the first waveguide ranges from 1 to 3 microns along the length of the rotator; and
a splitter coupled to the first waveguide of the rotator.

16. The receiver of claim 15, wherein the first waveguide and the second waveguide are separated by a dielectric layer with a thickness of at least 100 nm.

17. The receiver of claim 15, wherein the second waveguide is thinner than the first waveguide, and the first waveguide has a greater width than the second waveguide.

18. The receiver of claim 15, further comprising:
a first transition coupled to the first waveguide and configured to transfer light received from the first waveguide into a fourth waveguide made from a different material than the first waveguide; and
a second transition coupled to a first end of the splitter and configured to transfer light received from the splitter into a fifth waveguide made from a different material than the splitter,
wherein a second end of the splitter is unused.

* * * * *